United States Patent
Salomon

(10) Patent No.: US 10,162,724 B2
(45) Date of Patent: Dec. 25, 2018

(54) TECHNIQUE FOR INSPECTING A HOST COMPUTER

(71) Applicant: Cassidian Cybersecurity GmbH, Ottobrunn (DE)

(72) Inventor: Maxim Salomon, Hamburg (DE)

(73) Assignee: CASSIDIAN CYBERSECURITY GMBH, Ottobrunn (DE)

(*) Notice: Subject to any disclaimer, the term of this patent is extended or adjusted under 35 U.S.C. 154(b) by 0 days.

(21) Appl. No.: 15/382,926

(22) Filed: Dec. 19, 2016

(65) Prior Publication Data

US 2017/0177459 A1    Jun. 22, 2017

(30) Foreign Application Priority Data

Dec. 18, 2015 (EP) .................... 15201011

(51) Int. Cl.
  G06F 11/30    (2006.01)
  G06F 9/455    (2018.01)
  G06F 9/44     (2018.01)
  G06F 13/38    (2006.01)
  G06F 13/42    (2006.01)
  G06F 9/4401   (2018.01)
  (Continued)

(52) U.S. Cl.
  CPC ........ G06F 11/3051 (2013.01); G06F 9/4401 (2013.01); G06F 9/45558 (2013.01); G06F 11/3006 (2013.01); G06F 11/3037 (2013.01); G06F 13/385 (2013.01); G06F 13/4282 (2013.01); G06F 21/567 (2013.01); G06F 21/577 (2013.01); G06F 2009/45583 (2013.01); G06F 2009/45591 (2013.01)

(58) Field of Classification Search
  None
  See application file for complete search history.

(56) References Cited

U.S. PATENT DOCUMENTS

| | | | |
|---|---|---|---|
| 2003/0154429 A1 | 8/2003 | Chen | |
| 2009/0089460 A1* | 4/2009 | Komoda | ............ G06F 12/1458 710/13 |
| 2012/0047295 A1 | 2/2012 | Wong | |

FOREIGN PATENT DOCUMENTS

WO    2007115116    10/2007

OTHER PUBLICATIONS

European Search Report, dated May 10, 2016, priority document.
(Continued)

*Primary Examiner* — Farley Abad
*Assistant Examiner* — Dayton Lewis-Taylor
(74) *Attorney, Agent, or Firm* — Greer, Burns & Crain, Ltd.

(57) ABSTRACT

A method for inspecting a host computer using a USB device, wherein the USB device is selectively operable in a mass storage mode and in a computing mode. The method comprises booting an inspection operating system on the host computer from the USB device, when the USB device is operated in the mass storage mode, the inspection operating system providing one or more inspection functions for inspecting the host computer, switching the USB device from the mass storage mode to the computing mode, and inspecting the host computer using the one or more inspection functions of the inspection operating system, the one or more inspection functions being controlled from the USB device operated in the computing mode.

12 Claims, 3 Drawing Sheets

(51) Int. Cl.
  *G06F 21/56* (2013.01)
  *G06F 21/57* (2013.01)

(56) References Cited

OTHER PUBLICATIONS

"Desinfec't 2015" Juergen Schmidt, Jun. 13, 2015.
"https://webecache.googleusercontent.com/search?q=cache:pHK3_B4tsulJ:https://raw.githubusercontent.com/wiki/sduverger/ramoollax/ramooflax_en.pdf+&cd=2&hl=de&ct=clnk&gl=de", Duverger, Stephane, Ramooflax, übervisor.

* cited by examiner

TECHNIQUE FOR INSPECTING A HOST COMPUTER

CROSS-REFERENCES TO RELATED APPLICATIONS

This application claims the benefit of the European patent application No. 15201011.2 filed on Dec. 18, 2015, the entire disclosures of which are incorporated herein by way of reference.

BACKGROUND OF THE INVENTION

The present disclosure generally relates to inspecting a computer. More particularly, the present disclosure relates to a method for inspecting a host computer using a USB device as well as to a USB device for inspecting a host computer.

Techniques for inspecting computer systems have been studied for decades and, nowadays, a variety of tools are available that allow analyzing infected computer systems including, for example, software tools providing antivirus and malware detection and disinfection capabilities. Today, these tools have been widely adopted and are employed in various use cases to protect various kinds of systems against various types of malicious software.

Advanced tools available for inspecting a computer system not only provide capabilities for scanning an infected computer system for malicious software, but additionally provide capabilities for actively debugging an infected computer system while keeping the system running. Such tools allow monitoring the behavior of malicious software programs, for example, by monitoring respective processes running on an operating system and monitoring their communication by intercepting corresponding network traffic.

One such advanced inspection tool is Ramooflax, a free and open source virtualization tool delivered in the form of a minimalistic kernel acting as a hypervisor and allowing remote client access to the functions implemented in the hypervisor. Ramooflax allows for injecting a hypervisor for the purpose of virtualizing an operation system which is already installed on a physical computer system. The underlying idea is to boot the hypervisor on the physical computer system from an external storage media, for example, a USB stick, and, once the hypervisor is initialized, to boot the already installed operation system within the virtualized environment provided by the hypervisor. In this way, it is possible to analyze the operating system through the hypervisor while the operating system itself is running in its native environment. For remote client access to the hypervisor functions, an external computer must be connected to the physical computer system using available interfaces, such as, for example, using the physical computer system's Ethernet port.

In general, it is an essential requirement of tools like Ramooflax that their operation should possibly not be detected by the malicious software being monitored so that the malicious software itself is not aware that it is under inspection. The use of common communication technologies for remote client access, such as Ethernet, however, makes the monitoring activity easily detectable because the malicious software itself can be adapted to monitor the communication interfaces of the physical computer system. Further, some computer systems only support a limited number of interfaces so that connecting to the hypervisor via remote client access may not be possible at all because all interfaces of the computer system may already be in use. In other cases, although required interfaces might be available at the computer system, there may be other constraints, such as space constraints in a limited space environment, that make connecting an external computer acting as a remote client impossible.

SUMMARY OF THE INVENTION

It is thus an object of the present disclosure to provide a technique for inspecting a host computer that avoids one or more of these, or other, problems.

According to a first aspect, a method for inspecting a host computer using a USB device is provided. The USB device is selectively operable in a mass storage mode and in a computing mode. The method comprises booting an inspection operating system on the host computer from the USB device, when the USB device is operated in the mass storage mode, wherein the inspection operating system provides one or more inspection functions for inspecting the host computer, switching the USB device from the mass storage mode to the computing mode, and inspecting the host computer using the one or more inspection functions of the inspection operating system, wherein the one or more inspection functions are controlled from the USB device operated in the computing mode.

The USB device may be a self-contained computer having its own computing resources and may thus also be referred to as a USB computer. In one variant, the USB device may be a USB stick and the USB stick may be configured as a System on a Chip (SoC). The USB device may comprise a processor (e.g., CPU), a memory (e.g., RAM), a storage (e.g., a micro SD card) and an operating system (e.g., Linux) installed thereon. The USB device may further comprise a USB interface through which it may be plugged into (possibly via a USB cable) a USB port of the host computer to establish connectivity therewith. The USB device may be automatically powered on when it is plugged into the host computer and when it is supplied with power therefrom. USB devices of the described type are generally known. An example is the so called "USB armory" developed by Inverse Path which is provided in the form of a USB stick.

The host computer may be any kind of computer that is to be inspected, such as, for example, a personal computer, a server computer, a laptop computer, a tablet computer, or the like. The host computer may comprise a processor (e.g., CPU), a memory (e.g., RAM), a storage (e.g., an internal HDD), an operating system installed thereon and, optionally, one or more network interfaces. The host computer may further comprise a USB port into which the USB device may be plugged (possibly via a USB cable).

The USB device may comprise an I/O interface and operation of the USB device may be controlled from an external computer via the I/O interface. The external computer may thus be connected to the USB device via the I/O interface. As a user interface, the USB device (e.g., its operating system) may provide a console which may be used by the external computer to enter commands (e.g., via a command-line interface) for controlling the operation of the USB device.

In one implementation, the I/O interface may be a GPIO (general-purpose input/output) interface. In one such variant, a serial console may be connected to the GPIO to allow establishing a serial connection between the USB device and the external computer when the external computer is connected to the serial console. Also, the USB device may be connected to a terminal server via the I/O interface (e.g., via the serial console), thus, allowing the external computer to control operation of the USB device via the terminal server.

In other variants, other peripherals may be connected to the USB device via a daughter board connected to the GPIO, such as, for example, a Wi-Fi module, a Bluetooth interface or an NFC interface, to allow connectivity between the USB device and the external computer.

The USB device may be switched between a mass storage mode and a computing mode. In the mass storage mode, the USB device may emulate a USB mass storage device so that the USB device is detectable by the host computer as a USB mass storage device when plugged into the USB port of the host computer. In the computing mode, the USB device may be able to control the one or more inspection functions of the inspection operating system. The computing mode may thus also be referred to as an inspection mode. In the computing mode, the USB device may be detectable by the host computer, alternatively or additionally to a USB mass storage device, as some other form of device, such as, for example, an independent (e.g., networked) computer.

The inspection operating system may be stored in the storage of the USB device, for example, in a bootable partition thereof. Booting the inspection operating system may comprise loading the inspection operating system from the USB device to the host computer (e.g., into the memory of the host computer) and executing it thereon accordingly. When booting the inspection operating system on the host computer, the USB device may be operated in the mass storage mode so that the inspection operating system may be loaded from the USB device onto the host computer.

Once booting the inspection operating system is complete, the USB device may be switched from the mass storage mode to the computing mode. In one variant, switching from the mass storage mode to the computing mode may be triggered by toggling a hardware switch provided at the USB device. In another variant, switching from the mass storage mode to the computing mode may be triggered based on a software function. For example, the USB device may switch from the mass storage mode to the computing mode upon a user command received via the I/O interface from the external computer. In one particular variant, switching the USB device from the mass storage mode to the computing mode may be triggered upon detecting by the USB device that a predetermined file is placed onto the USB device (e.g., into a storage of the USB device). This file may be written to the USB device by the inspection operating system in order to indicate that booting the inspection operating system is complete. The USB device may detect the new file and switch from the mass storage mode to the computing mode accordingly. Once the USB device operates in the computing mode, it may begin inspecting the host computer by controlling the one or more inspection functions of the inspection operating system.

In one implementation, the one or more inspection functions of the inspection operating system may comprise scanning (e.g., a storage of) the host computer for malicious software. Such scanning may comprise scanning a file system of the host computer, for example, for viruses, Trojan horses, spyware or other types of malicious software. For purposes of removing detected malicious software, the inspection operating system may provide one or more disinfection functions for disinfecting the host computer. The host computer may be disinfected using the one or more disinfection functions of the inspection operating system, wherein the one or more disinfection functions may be controlled from the USB device operated in the computing mode. The one or more disinfection functions may comprise, for example, a deleting function or a quarantining function for infected files or for malicious software applications. An inspection operating system supporting these functions is referred to herein as a "disinfection operating system."

In another implementation, the one or more inspection functions of the inspection operating system may enable debugging the host computer's operating system, for example, for the purpose of monitoring the behavior of a malicious software application. To this end, the inspection operating system may execute a hypervisor, wherein the hypervisor runs a virtual machine, and wherein a host computer operating system is booted within the virtual machine from a storage of the host computer. Inspecting the host computer may in this case comprise inspecting the host computer operating system. More specifically, the one or more inspection functions of the inspection operating system may comprise at least one of monitoring a process executed on the host computer operating system, monitoring a network connection on the host computer operating system, monitoring a file system of the host computer operating system, monitoring a memory of the virtual machine, and monitoring a CPU register of the virtual machine. An inspection operating system supporting these functions is referred to herein as a "hypervisor operating system."

For the purpose of controlling the one or more inspection functions and/or the one or more disinfection functions of the inspection operating system, the USB device (e.g., the operating system thereof) may communicate with the inspection operating system via the USB interface. In one variant, the USB device may communicate with the inspection operating system using a proprietary protocol, for example, a proprietary USB protocol.

In order to activate one of the one or more inspection and/or disinfection functions of the inspection operating system, the USB device may instruct the inspection operating system via the USB interface accordingly. As an interface, the inspection operating system may provide a dedicated console for this purpose which may be used by the USB device to enter commands for controlling the functions of the inspection operating system. The inspection operating system, in turn, may return results of the inspection and/or disinfection functions to the USB device via the USB interface. If the USB device is controlled from an external computer via the I/O interface, an instruction to the inspection operating system may be given from the external computer (e.g., upon a user input) and may be forwarded by the USB device to the inspection operating system. Similarly, results returned from the inspection operating system to the USB device may be forwarded to the external computer (e.g., for display to the user).

In one particular implementation, the USB device may store a plurality of bootable inspection operating systems. Prior to booting the inspection operating system, the inspection operating system may be selected among the plurality of bootable inspection operating systems. In one variant, the USB device may store a hypervisor operating system and a disinfection operating system. Prior to booting the inspection operating system on the host computer, a selection may be made whether the hypervisor operating system or the disinfection operating system shall be booted.

According to a second aspect, a USB device for inspecting a host computer is provided. The USB device is selectively operable in a mass storage mode and in a computing mode. The USB device comprises a storage storing an inspection operating system bootable on a host computer, when the USB device is operated in the mass storage mode. The inspection operating system provides one or more inspection functions for inspecting the host computer. The USB device further comprises a processor and a memory, wherein the memory contains instructions executable by the processor such that the USB device is operable to switch from the mass storage mode to the computing mode, and control the one or more inspection functions of the inspection operating system, when the inspection operating system has been booted on the host computer and when the USB device is operated in the computing mode.

All aspects described above with reference to the method of the first aspect relating to the characteristics, features and configurations of the USB device are applicable to the USB device of the second aspect as well. Unnecessary repetitions are thus omitted.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
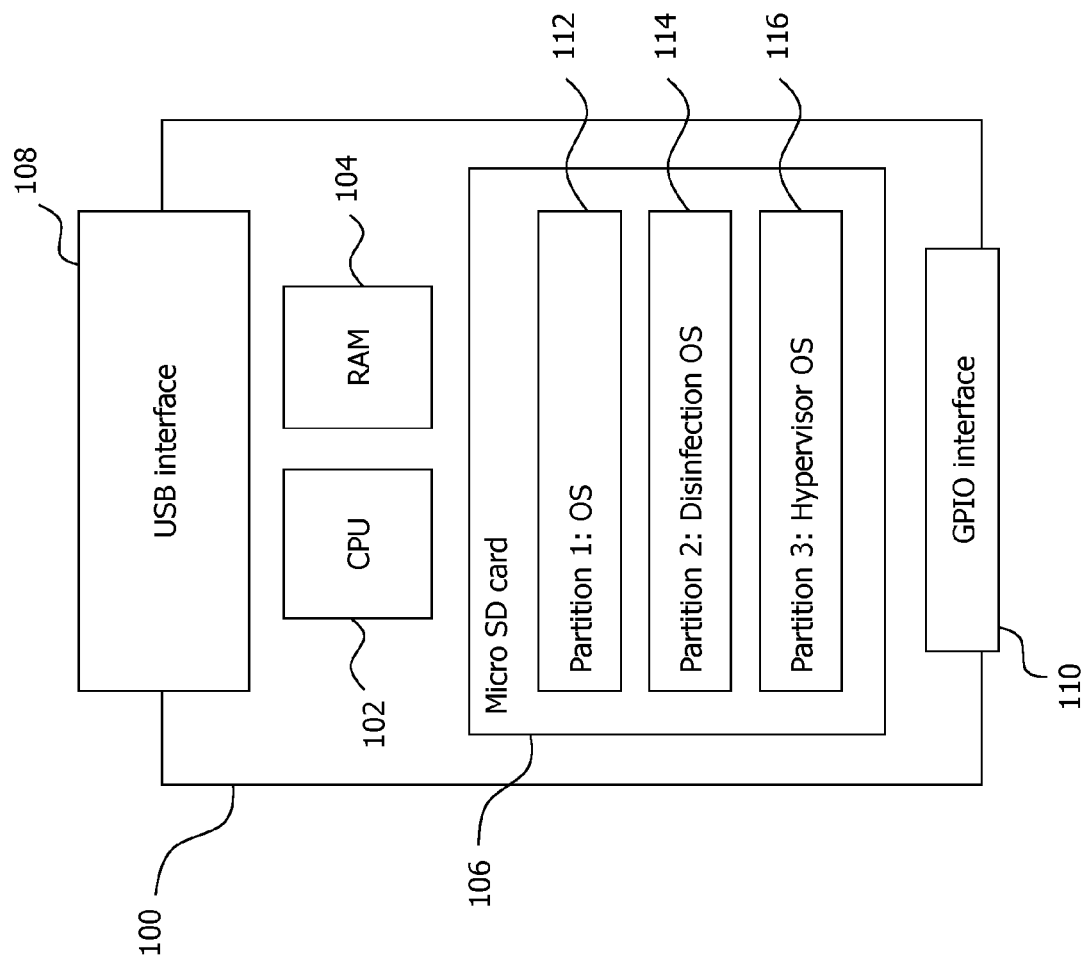
FIG. 1 schematically illustrates a composition of a USB device for inspecting a host computer according to the present disclosure.

FIG. 1 schematically illustrates an exemplary composition of a USB device 100 which can be used to inspect a host computer. The USB device 100 comes in the form of a USB stick. The USB device 100 is configured as a System on a Chip (SoC), i.e., the USB device 100 is a self-contained computer having its own computing resources and being capable of running as an independent USB computer. The USB device 100 comprises a processor 102, a memory 104, a storage 106, a USB interface 108 and a general purpose input-output (GPIO) interface 110.

The memory 104 of the USB device 100 may contain, or be loaded from the storage 106 by, instructions executable by the processor 102 such that the USB device 100 is operable to perform the functions described herein.

The storage 106 of the USB device 100 is a micro SD card in the given example, but may be any other type of permanent memory which may be installed on the USB device 100. In the example of FIG. 1, the storage 106 stores three bootable partitions, namely a first partition on which an operating system 112 for operating the USB device 100 as a USB computer is installed, a second partition on which a disinfection operating system 114 is installed, and a third partition on which a hypervisor operating system 116 is installed. Both the disinfection operating system 114 and the hypervisor operating system 116 represent inspection operating systems in the sense of the present disclosure. The operating system 112 may be a Linux operating system having a minimalistic kernel, for example.

The USB interface 108 of the USB device 100 may be used to plug the USB device 100 into a USB port of a host computer in order to establish connectivity therewith. The USB device 100 may be automatically powered on when it is plugged into the host computer and when it is supplied with power therefrom. Once the USB device 100 is plugged into the host computer, it may initially boot the operating system 112.

The GPIO interface 110 of the USB device 100 provides an I/O interface that may be used to connect an external computer to the USB device 100 for remote control purposes. To this end, the operating system 112 may provide a console which may be used by the external computer to enter commands (e.g., via a command-line interface) for controlling operation of the USB device 100. In order to establish connectivity between the GPIO interface 110 and the external computer, a serial console may be connected to the GPIO interface 110, thus, allowing a serial connection to be established between the USB device 100 and the external computer when the external computer is connected to the serial console. This is advantageous in cases in which the host computer only comprises a limited number of interfaces. For example, if the host computer comprises no interfaces other than a single USB port, the USB device 100 may act as an intermediate entity which enables remote control of the host computer by an external computer. It will be understood that, instead of using a serial console for establishing connectivity between the external computer and the GPIO interface 110, other peripheral devices may be used for the same purpose. For example, a Wi-Fi module, a Bluetooth interface or an NFC interface may be connected to the GPIO interface 110 via a daughter board.

As an alternative way of connecting the USB device 100 to the external computer, the USB device 100 may be connected to a terminal server (e.g., using a serial console or another peripheral using the GPIO interface 110, as described above) so that the USB device 100 may be controlled from an external computer via the terminal server, i.e., via a terminal server connection. This is advantageous in limited space environments where space constraints do not allow connecting a physical computer to the host computer to be inspected. This may be the case, for example, in rack environments in a data center. In such cases, the USB device 100 must only be plugged in and be connected to a terminal server. Remote control may then be performed from a computer external to the data center via the terminal server.

The disinfection operating system 114, when booted on the host computer from the USB device 100, provides functions for inspecting and disinfecting the host computer. On the one hand, the disinfection operating system 114 provides functions for scanning (e.g., a storage of) the host computer for malicious software. Such scanning may comprise scanning the storage of the host computer, for example, for viruses, Trojan horses, spyware or other types of malicious software. For purposes of removing detected malicious software, on the other hand, the disinfection operating system 114 provides functions for disinfecting the host computer. Such functions may comprise deleting functions or quarantining functions for infected files or for malicious software applications detected, for example.

The hypervisor operating system 116, when booted on the host computer from the USB device 100, provides functions for debugging the host computer's operating system, for example, for the purpose of monitoring the behavior of a malicious software application. To this end, the hypervisor operating system 116 executes a hypervisor and the hypervisor itself runs a virtual machine. The host computer operating system is then booted within the virtual machine from a storage of the host computer. In this way, the host computer operating system is—although it is executed on the native environment of the host computer—run within a virtualized environment provided by the hypervisor. The hypervisor may thus intercept, for example, any process, memory or CPU instruction executed in the host computer operating system. Inspection functions provided by the hypervisor operating system 116 may therefore comprise at least one of monitoring a process executed on the host computer operating system, monitoring a network connection on the host computer operating system, monitoring a file system of the host computer operating system, monitoring a memory of the virtual machine, and monitoring a CPU register of the virtual machine.

The USB device 100 may be selectively operated in a mass storage mode and in a computing mode. In the mass storage mode, the USB device 100 emulates a USB mass storage device so that the USB device 100 is detectable by the host computer as a USB mass storage device when plugged into the USB port of the host computer. In the computing mode, the USB device 100 is able to control the inspection/disinfection functions of the disinfection operating system 114 or the hypervisor operating system 116, respectively. In the computing mode, the USB device 100 may be detectable by the host computer, alternatively or additionally to a USB mass storage device, as some other form of device, such as, for example, an independent (e.g., networked) computer.

Figure 2:
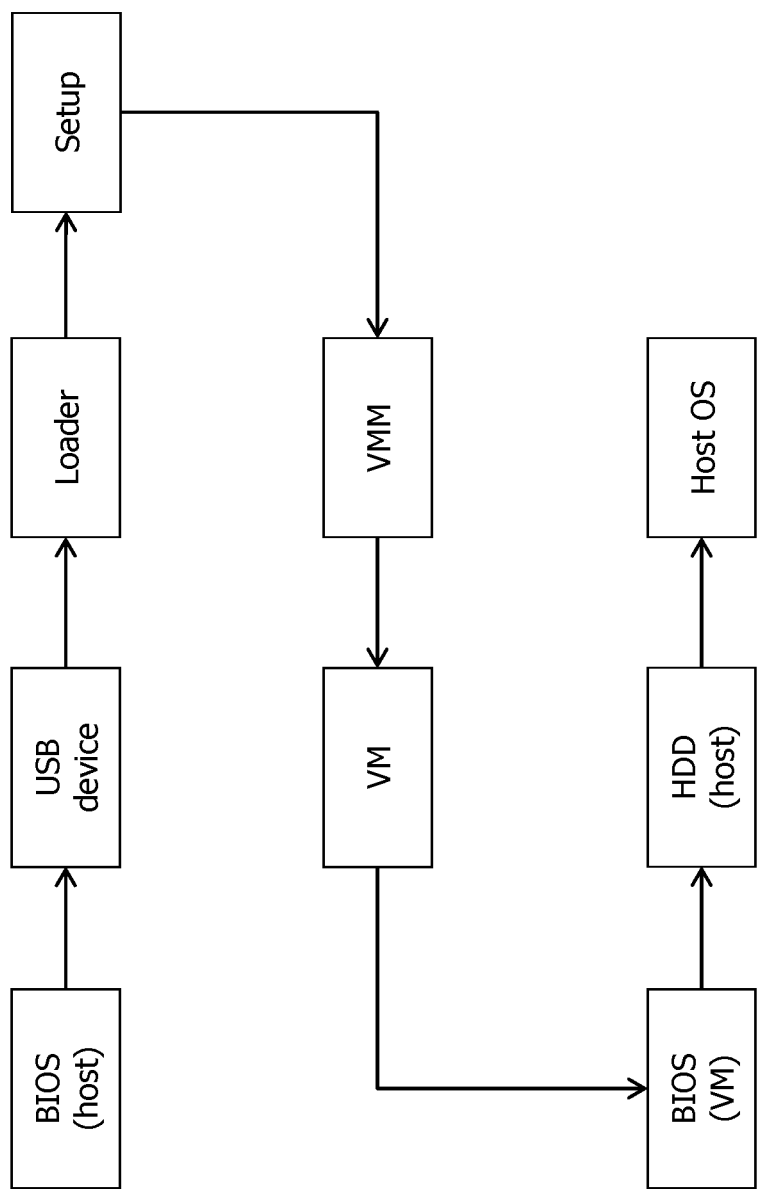
FIG. 2 schematically illustrates a process of booting a host computer operating system within a virtual machine run by a hypervisor operating system of the USB device of FIG. 1.

A general process of booting a host computer operating system is schematically illustrated in FIG. 2. Here, it is indicated that, via the BIOS of the host computer, the hypervisor operating system 116 is booted on the host computer from the USB device 100. A bootloader loads the hypervisor operating system 116 into the memory of the host computer, where an initial setup is performed to execute a hypervisor (also called virtual machine manager, VMM). The hypervisor, in turn, runs a virtual machine (VM). Then, via the BIOS of the virtual machine, the host computer operating system is booted within the virtual machine from, e.g., a hard drive (HDD) of the host computer. Once complete, the host computer operating system is run within the virtual machine, but is though executed on the native environment of the host computer.

Figure 3:
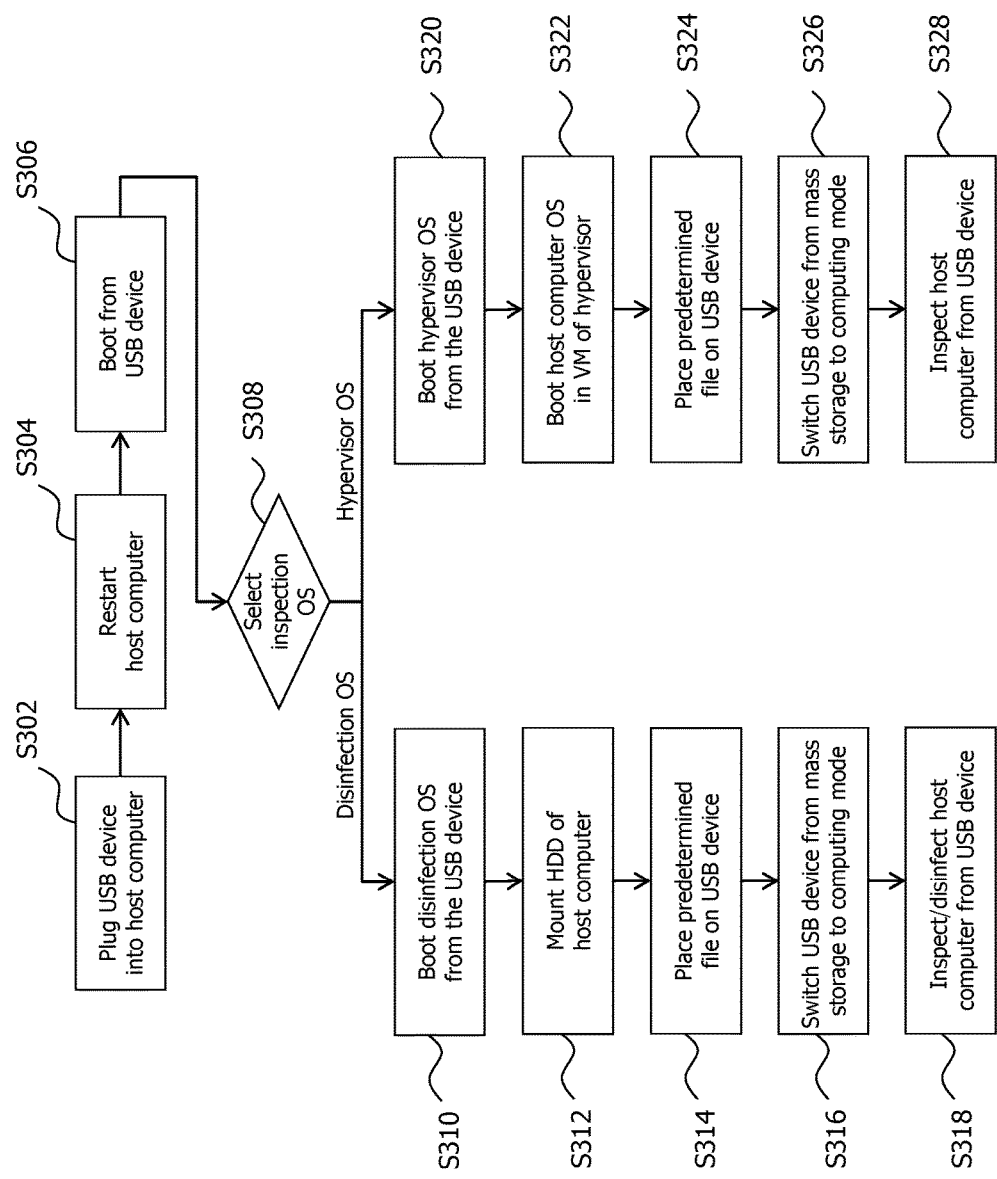
FIG. 3 schematically illustrates an exemplary flowchart of a method for inspecting a host computer using the USB device of FIG. 1.

FIG. 3 schematically illustrates a flowchart of a method for inspecting a host computer using the USB device 100. At the beginning, the USB device 100 is plugged into the USB port of the host computer in step S302. The USB device 100 is thus supplied with power, starts up and boots the operating system 112. At this point, the USB device 100 is operated in the mass storage mode. Then, in step S304, the host computer is restarted and, in step S306, newly boots from the USB device 100. In step S308, a selection needs to be made at the host computer to define whether the disinfection operating system 114 or the hypervisor operating system 116 is to be booted. Corresponding selection options may be provided by a bootloader stored on the USB device 100 and displayed on a display of the host computer, for example. The selection may be made by a user of the host computer.

If, in step S308, the disinfection operating system 114 is selected, the disinfection operating system 114 is booted on the host computer from the USB device 100 in step S310. The disinfection operating system 114 then mounts available storage devices (e.g., an internal HDD) of the host computer in step S312. Once this is done, the disinfection operating system 114 is ready to perform its inspection/disinfection functions. The disinfection operating system 114 thus informs, in step S314, the USB device 100 that booting is complete by placing a predetermined file onto the USB device 100 (e.g., into a predetermined location in a file system of the operating system 112). The USB device 100 detects the new file and switches from the mass storage mode to the computing mode in step S316. It will be understood that switching the USB device 100 from the mass storage mode to the computing mode may be triggered in various other ways. For example, the switching may be triggered by toggling a hardware switch provided at the USB device 100, or upon a user command received via the GPIO interface 110 from the external computer.

Once the USB device 100 operates in the computing mode, it may begin inspecting/disinfecting the host computer by controlling the inspection/disinfection functions of the disinfection operating system 114. To this end, the USB device 100 may communicate with the disinfection operating system 114 via the USB interface 108 in step S318. For example, in order to activate certain inspection/disinfection functions, the USB device 100 may instruct the disinfection operating system 114 to activate such inspection/disinfection functions. The disinfection operating system 114 may provide a dedicated console for this purpose which may be used by the USB device 100 to enter respective commands to the disinfection operating system 114. The disinfection operating system 114, in turn, may return results of the inspection/disinfection functions to the USB device 100 via the USB interface 108. Such results may comprise, for example, the results of a virus scan or a notification that a quarantining operation was successful/unsuccessful. The USB device 100 may write the results into a log file in the storage of the USB device 100. If the USB device 100 is controlled through remote access from an external computer via the GPIO interface 110, an instruction to the disinfection operating system 114 may be given from the external computer (e.g., upon a user input) and may be forwarded by the USB device 100 to the disinfection operating system 114. Similarly, results returned from the inspection operating system to the USB device 100 may be forwarded to the external computer (e.g., for display to the user).

If, in step S308, the hypervisor operating system 116 is selected, the hypervisor operating system 116 is booted on the host computer from the USB device 100 in step S320. The hypervisor operating system 116 performs a setup to execute a hypervisor which, in turn, runs a virtual machine. The host computer operating system is then booted within the virtual machine in step S322. This process has been described in more detail with reference to FIG. 2 above. Once this process is finished, the hypervisor operating system 116 is ready to perform its inspection functions. The hypervisor operating system 116 thus informs, in step S324, the USB device 100 that booting is complete by placing a predetermined file onto the USB device 100 (e.g., into a predetermined location in a file system of the operating system 112). The USB device 100 detects the new file and switches from the mass storage mode to the computing mode in step S326. It will be understood that switching the USB device 100 from the mass storage mode to the computing mode may be triggered in various other ways. For example, switching from the mass storage mode to the computing mode may be triggered by toggling a hardware switch provided at the USB device 100, or upon a user command received via the GPIO interface 110 from the external computer.

Once the USB device 100 operates in the computing mode, it may begin inspecting the host computer by controlling the inspection functions of the hypervisor operating system 116. To this end, the USB device 100 may communicate with the hypervisor operating system 116 via the USB interface 108 in step S328. For example, in order to activate certain inspection functions, the USB device 100 may instruct the hypervisor operating system 116 to activate such inspection functions. The hypervisor operating system 116 may provide a dedicated console for this purpose which may be used by the USB device 100 to enter respective commands to the hypervisor operating system 116. The hypervisor operating system 116, in turn, may return results of the inspection functions to the USB device 100 via the USB interface 108. Such results may comprise, for example, outputting information on monitored processes, on network traffic observed on network connections, on changes in a file system, usage of memory and/or contents of the CPU registers. The USB device 100 may write these results into a log file in the storage of the USB device 100. If the USB device 100 is controlled through remote access from an external computer via the GPIO interface 110, an instruction to the hypervisor operating system 116 may be given from the external computer (e.g., upon a user input) and may be forwarded by the USB device 100 to the hypervisor operating system 116. Similarly, results returned from the inspection operating system to the USB device 100 may be forwarded to the external computer (e.g., for display to the user).

For communication between the USB device 100 and the hypervisor operating system 116, a proprietary protocol, for example, a proprietary USB protocol may be used. Rather than common communication protocols, for example, Ethernet over USB, a proprietary protocol may not easily be detectable by a malicious software application which attempts to detect whether it is under inspection.

As has become apparent from the above description, the USB device of the present disclosure may combine functions for inspecting and/or disinfecting a host computer in just one single device. Depending on which type of inspection operating system is booted, the USB device may allow an operator to actively debug a host computer and perform tasks, such as intercepting network traffic and monitoring any process, communication or memory of an infected computer system without possibly being detected while performing such task. The USB device may further allow an operator to actively disinfect a virus or malware contaminated host computer. Using the USB device of the present disclosure, all required inspection/disinfection functions may be executed via the USB interface of the host computer and, thus, the USB device may even be usable with host computers that comprise a single USB port only, but no other interfaces. The USB device may not only allow an operator to perform inspection/disinfection tasks locally in front of the physical host computer, but also to perform these tasks remotely, for example, via a terminal server connection. It is thus conceivable, to ship the USB device to a customer who only needs to plug the device into the host computer and connect it to a terminal server. Support may then be provided by an operator from remote. Further, due to the use of a proprietary USB protocol between the USB device and the host computer, it is made more difficult for adversaries in control of the infected computer to detect that the computer is under inspection.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for inspecting a host computer using a USB device, the USB device being configured to be selectively operable in a mass storage mode and in a computing mode, the method comprising:
    booting an inspection operating system on the host computer from the USB device, when the USB device is operated in the mass storage mode, the inspection operating system providing one or more inspection functions for inspecting the host computer, and wherein the inspection operating system executes a hypervisor, wherein the hypervisor runs a virtual machine;
    switching the USB device from the mass storage mode to the computing mode;
    inspecting the host computer using the one or more inspection functions of the inspection operating system, the one or more inspection functions being controlled from the USB device operated in the computing mode; and
    booting a host computer operating system within the virtual machine from a storage of the host computer.

2. The method of claim 1, wherein the USB device is a USB stick.

3. The method of claim 1, wherein the USB device comprises an I/O interface, and wherein operation of the USB device is controlled from an external computer via the I/O interface.

4. The method of claim 3, wherein the USB device is connected to a terminal server via the I/O interface, and wherein the external computer controls operation of the USB device via the terminal server.

5. The method of claim 3, wherein the I/O interface is a general-purpose input/output (GPIO) interface.

6. The method of claim 1, wherein switching the USB device from the mass storage mode to the computing mode is triggered upon detecting by the USB device that a predetermined file is placed onto the USB device.

7. The method of claim 1, wherein the one or more inspection functions comprise scanning the host computer for malicious software.

8. The method of claim 1, wherein the inspection operating system provides one or more disinfection functions for disinfecting the host computer, and wherein the method further comprises:
    disinfecting the host computer using the one or more disinfection functions of the inspection operating system, the one or more disinfection functions being controlled from the USB device operated in the computing mode.

9. The method of claim 1, wherein the one or more inspection functions comprise at least one of:
monitoring a process executed on the host computer operating system,
monitoring a network connection on the host computer operating system,
monitoring a file system of the host computer operating system,
monitoring a memory of the virtual machine, and
monitoring a CPU register of the virtual machine.

10. The method of claim 1, wherein the USB device communicates with the inspection operating system using a proprietary protocol.

11. The method of claim 1, wherein the USB device stores a plurality of bootable inspection operating systems, and wherein the method further comprises:
selecting the inspection operating system among the plurality of bootable inspection operating systems prior to booting the inspection operating system.

12. A USB device for inspecting a host computer, the USB device being selectively operable in a mass storage mode and in a computing mode, the USB device comprising:
a storage storing an inspection operating system bootable on a host computer, when the USB device is operated in the mass storage mode, the inspection operating system providing one or more inspection functions for inspecting the host computer and the inspection operating system executing a hypervisor which runs a virtual machine;
a processor and a memory, the memory containing instructions executable by the processor such that the USB device is operable to:
switch from the mass storage mode to the computing mode;
control the one or more inspection functions of the inspection operating system, when the inspection operating system has been booted on the host computer and when the USB device is operated in the computing mode; and boot a host computer operating system within the virtual machine from a storage of the host computer.

* * * * *